March 2, 1937.  N. SHOAN  2,072,569
DETACHABLE HANDLE
Filed Dec. 24, 1935
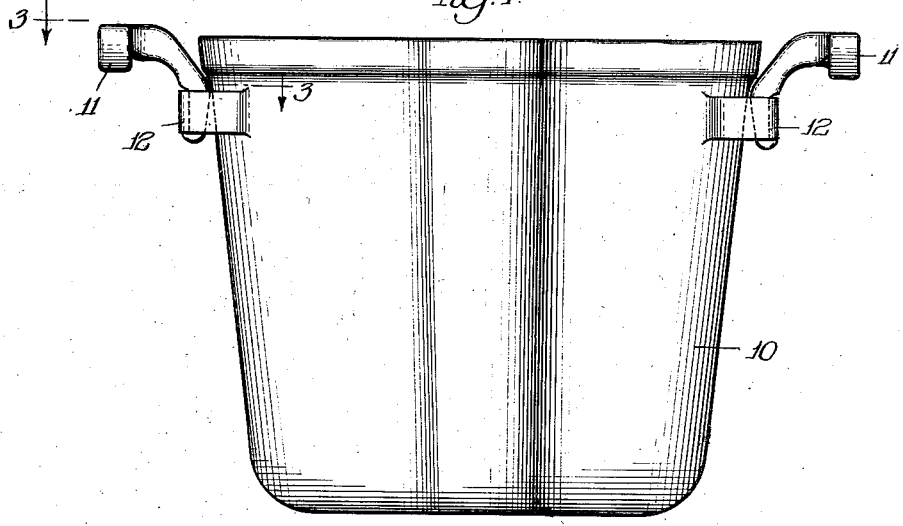
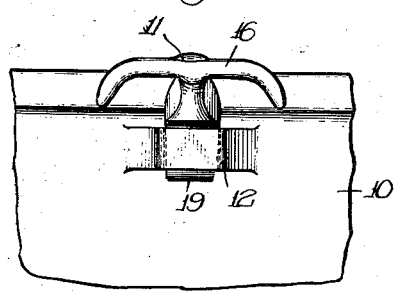
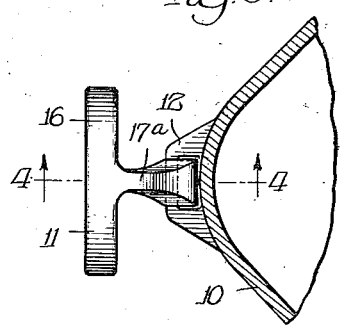
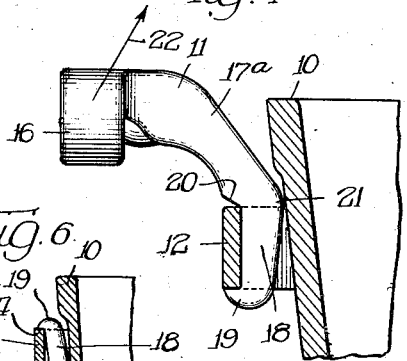
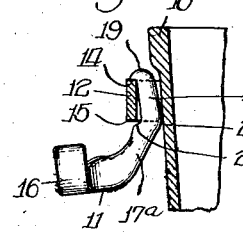
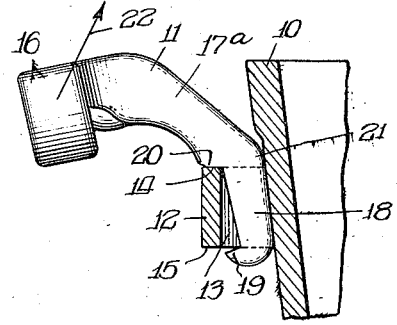
Inventor:
Nels Shoan,
By Wilkinson, Huxley, Byron & Knight
Attys Patented Mar. 2, 1937

2,072,569

UNITED STATES PATENT OFFICE 2,072,569

DETACHABLE HANDLE

Nels Shoan, Chicago, Ill., assignor to Advance Aluminum Castings Corp., Chicago, Ill., a corporation of Illinois Application December 24, 1935, Serial No. 55,999

9 Claims. (Cl. 53—8)

The present invention relates to detachable handles.

More particularly the present invention relates to vessels and handles associated therewith, which handles are intended to be detachable. In the past, detachable handles have been provided for vessels whereby space was conserved upon the top of a stove and whereby, if desired, a cool handle could be quickly attached to a hot vessel for the purpose of moving said vessel before the heat therein could flow into such handle to such an extent as to make said handle uncomfortable to the operator. Such devices as have come to the attention of applicant in the past have left much to be desired in the way of easy attachment to and detachment from the vessel, or have lacked the advantage that the handle could be left in place upon the vessel, if desired, while still being instantly detachable.

An object of the present invention is to provide a vessel and a readily detachable handle therefor which is simple, sturdy, inexpensive and efficient in service.

A further object is to provide such a combination in which the handle may be left in place upon the vessel when the handle is not being manipulated but will be instantly detachable at all times.

A further object is to provide a detachable handle which is highly efficient, which occupies a minimum of space, and which may be readily attached to and detached from a vessel.

Further objects will appear as the description proceeds.

Referring to the drawing—

Figure 1 represents a kettle, or the like, having a pair of handles mounted thereon, said figure showing one embodiment of the present invention;

Figure 2 is a fragmentary view showing, from a different angle, a part of the kettle of Figure 1 and a handle attached thereto;

Figure 3 is a fragmentary view, partly in section, taken along the planes indicated by the arrows 3—3 of Figure 1;

Figure 4 is a sectional view taken along the planes indicated by the arrows 4—4 of Figure 3;

Figure 5 is a view similar to Figure 4 but showing a handle in a position it will assume when left upon the kettel without having a lifting force applied to said handle; and Figure 6 is a fragmentary view illustrating the reversability of a handle according to the present invention.

The numeral 10 indicates a kettle, or other vessel, and the numerals 11—11 indicate detachable handles which cooperate with the kettel 10. Said handles 11—11 will ordinarily be disposed at diametrically opposed regions exteriorly of the kettle. For the reception of the handles 11—11, the kettle according to the illustrated embodiment of the present invention is provided with a pair of loops 12—12, illustrated as being cast integrally with the kettle 10. Each of said loops provides a recess 13 having an axis disposed vertically or nearly vertically. Each loop 12 is provided with the top surface 14 and the bottom surface 15 for cooperation with a corresponding handle 11. Each handle 11 includes a finger grip portion, indicated by the numeral 16, and a loop engaging portion 17. Said finger grip portion 16 and said loop engaging portion 17 are connected by the shank 17a. Said loop engaging portion comprises the tapering portion 18 having the shoulder 19 at one extremity thereof and the shoulder 20 at the other extremity thereof. Said shoulders 19 and 20 are spaced apart a distance only slightly greater than the vertical dimension of the loop 12. The upper region of the tapering portion 18 is of such thickness radially of the kettle as to fit easily within the loop 12, which means that when the handle 11 is in position within the loop 12, the shoulder 20 will surely overlie the upper surface 14 of said loop, whereby downward movement of the handle is limited. The finger grip portion 16 and the shank 17a of the handle are offset from the tapering portion 15, and consequently when the handle 11 is left upon the kettle without having lifting force exerted thereupon, said handle will occupy a position such as illustrated in Figure 5.

The lower extremity of the tapered portion 18 is rounded off, whereby to pilot the lower extremity of the handle 11 into the space within the loop 12. The dimension crosswise of the lower portion of the handle 11 from the outer edge of the shoulder 19 to the portion adapted to abut the side of the kettle should be such that the lower portion of the handle may be inserted readily within the loop 12.

Expressed in other language, the present invention contemplates a kettle and a handle (or a pair of handles), the handle being so shaped that it may be readily inserted into the loop 12, but is limited against downward movement by engagement of the top surface 14 with the shoulder 20. The region opposite the shoulder 20, indicated by the numeral 21, operates as a fulcrum about which the handle 11 will swing when a lifting force is applied to lift the kettle 10. In other words, such a swinging effect will be had when a lifting force is exerted in a direction inclined toward the axis of the kettle 10. Such a force is indicated by the arrow 22 in Figure 5. When it is desired to remove the handle 11 from the kettle, a simple sliding movement of the handle along the wall of the kettle will result in the withdrawal of the tapered portion 18 and the shoulder 19 from within the loop 12.

Under certain circumstances it is advantageous to reverse the position of a handle and use it as illustrated in Figure 6. The illustrated embodiment of the present invention is well adapted for such use, the shoulder 19 resting upon the upper surface of the loop 12 and the portion 21 of the handle resting against the side of the vessel 10 when no lifting force is applied to the handle. When a lifting force is applied, the shoulder 20 engages under the loop 12 and the other extremity of the tapering portion 18 is swung against the side of the kettle to act as a fulcrum, whereby lifting or tilting of the kettle may be accomplished.

The construction illustrated and described is easy to manipulate and is readily attached to and detached from the kettle, and when it is desired to leave a handle upon the kettle, said handle will assume an unobtrusive position, from which it may be readily manipulated either in lifting the kettle or in removing the handle from within the loop 12.

Though a preferred embodiment of the present invention has been described in detail, many modifications will occur to those skilled in the art. It is intended to cover all such modifications that fall within the scope of the appended claims.

What is claimed is—

1. In combination, a vessel having a loop disposed exteriorly thereof, and a handle having a portion adapted to be inserted within said loop, said portion having shoulders spaced apart a distance substantially equal to the corresponding dimension of said loop, said portion between said shoulders having a maximum overall dimension transversely of said kettle approximately equal to the corresponding dimension of the space within said loop and being freely insertable into said loop but being swingable within said loop about a fulcrum disposed adjacent to the upper region of said portion.

2. In combination, a vessel having a loop disposed exteriorly thereof, and a handle having a portion adapted to be inserted within said loop, said portion having shoulders spaced apart a distance substantially equal to the corresponding dimension of said loop, said portion between said shoulders having a maximum overall dimension transversely of said kettle approximately equal to the corresponding dimension of the space within said loop and being freely insertable into said loop but being swingable within said loop about a fulcrum disposed adjacent to the upper region of said portion, said handle being weighted to swing said portion toward said vessel.

3. In combination, a vessel having a loop disposed exteriorly thereof, said loop having an opening disposed in the same general direction as the axis of said kettle, and a handle having a portion adapted to be freely inserted into and withdrawn from said loop, the upper region of said portion having a dimension transversely of said kettle sufficiently great to approximately equal the corresponding dimension of the opening in said loop, said portion being so correlated to said loop as to be swingable toward and away from said vessel about a fulcrum disposed at the upper region of said portion.

4. In combination, a vessel having a loop disposed exteriorly thereof, said loop having an opening disposed in the same general direction as the axis of said kettle, and a handle having a portion adapted to be disposed within said loop, the upper region of said portion having a dimension transversely of said kettle sufficiently great to approximately equal the corresponding dimension of the opening in said loop, said portion being so correlated to said loop as to be swingable toward and away from said vessel about a fulcrum disposed at the upper region of said portion, said portion being provided with shoulders at its upper region and its lower region, said shoulder at said upper region being sufficiently wide to limit movement of said portion within said loop, said shoulder at said lower region being sufficiently narrow to permit free passage thereof through said loop.

5. In combination, a kettle having a loop disposed exteriorly thereof, a handle having a tapering portion adapted to be disposed within said loop, said tapering portion having a fulcrum portion at one end thereof, and a shoulder adapted to abut against the upper edge of said loop, said shoulder being disposed oppositely to said fulcrum portion, the lower extremity of said tapered portion being provided with a shoulder adapted to engage the lower edge of said loop, the lower part of said tapering portion including said lower shoulder being sufficiently small to pass freely through said loop.

6. In combination, a vessel having a loop disposed exteriorly thereof, said loop having an opening disposed in the same general direction as the axis of said kettle, and a handle having a portion adapted to be disposed within said loop, the upper region of said portion having a dimension transversely of said kettle sufficiently great to approximately equal the corresponding dimension of the opening in said loop, said portion being so correlated to said loop as to be swingable toward and away from said vessel about a fulcrum disposed at the upper region of said portion, said handle being weighted to swing said portion toward said vessel.

7. In combination, a vessel having a loop disposed exteriorly thereof, said loop having an opening disposed in the same general direction as the axis of said kettle, and a handle having a portion adapted to be disposed within said loop, the upper region of said portion having a dimension transversely of said kettle sufficiently great to approximately equal the corresponding dimension of the opening in said loop, said portion being so correlated to said loop as to be swingable toward and away from said vessel about a fulcrum disposed at the upper region of said portion, said portion being provided with shoulders at its upper region and its lower region, said shoulder at said upper region being sufficiently wide to limit movement of said portion within said loop, said shoulder at said lower region being sufficiently narrow to permit free passage thereof through said loop, said handle being weighted to swing said portion toward said vessel.

8. In combination, a kettle having a loop disposed exteriorly thereof, a handle having a tapering portion adapted to be disposed within said loop, said tapering portion having a fulcrum portion at one end thereof, and a shoulder adapted to abut against the upper edge of said loop, said shoulder being disposed oppositely to said fulcrum portion, the lower extremity of said tapered portion being provided with a shoulder adapted to engage the lower edge of said loop, the lower part of said tapering portion including said lower shoulder being sufficiently small to pass freely through said loop, said handle being weighted to swing said portion toward said vessel.

9. In combination, a vessel having a loop disposed exteriorly thereof, and a handle having a portion adapted to be inserted within said loop, said portion having shoulders spaced apart a distance substantially equal to the corresponding dimension of said loop, said portion between said shoulders having a thickness transversely of said kettle approximately equal to the corresponding dimension of the space within said loop and being freely insertable into said loop but being swingable within said loop in the plane of the vertical axes of said vessel, said portion having a piloting end and being adapted to be inserted selectably through either end of said loop.

NELS SHOAN.